Jan. 19, 1960  R. V. THOMAS  2,922,080
GRID CONTROL OF THYRATRON DEIONIZATION
Filed July 1, 1958  2 Sheets-Sheet 1
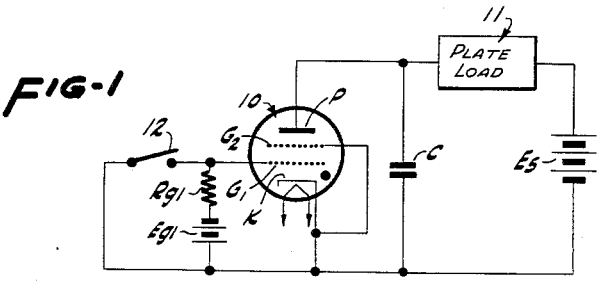
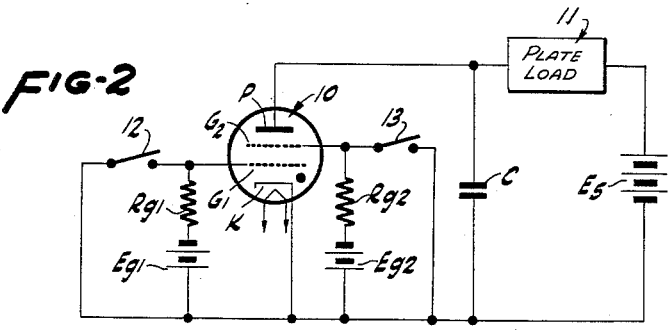
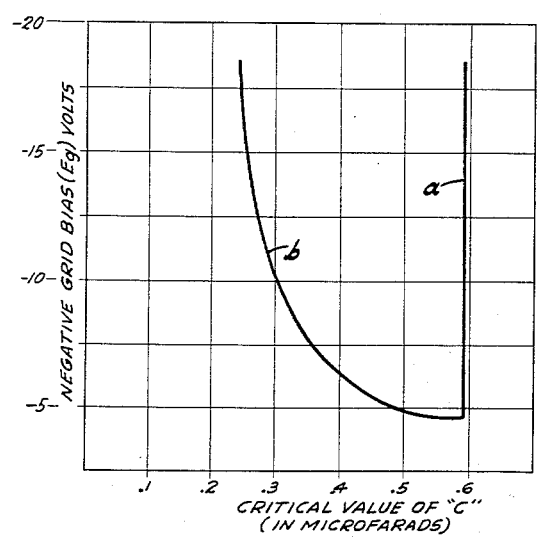
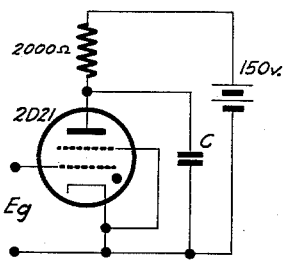
INVENTOR.
RICHARD V. THOMAS
BY
Mellin and Hanscom
ATTORNEYS United States Patent Office 2,922,080
Patented Jan. 19, 1960

2,922,080

GRID CONTROL OF THYRATRON DEIONIZATION

Richard V. Thomas, Seattle, Wash., assignor to Tally Register Corporation, Seattle, Wash., a corporation of Washington Application July 1, 1958, Serial No. 745,980

4 Claims. (Cl. 315—340)

This invention relates to a method and means for controlling the operation of the class of gaseous thermionic tubes generally referred to as thyratrons, and, more specifically, to the deionization of such tubes by the application of a relatively low negative potential to the control grids thereof.

In the normal operation of a thyratron with its plate connected through a suitable plate load circuit to a continuously positive voltage source, conduction may occur by the application of suitable voltages to the control grids (usually two) thereof. Once conduction has started, all control is lost by the grids, and high negative potentials may be impressed thereon without affecting the conduction of the tube. Conduction can be stopped only by the interruption of the plate circuit, as by a switch or relay.

It would be very desirable if the deionization of the thyratron could be controlled by the application of a negative potential to the control grids, since this would eliminate the mechanical plate circuit breaking devices, and would thus greatly decrease the time required from the initiation of the circuit breaking device until the thyratron is deionized, as well as requiring little, if any, power to ultimately bring about such deionization. In circuits wherein thyratrons are utilized as high speed relays, as in computing devices and the like, the speed of operation of the computing device will often be governed by the time lapses between the time when it is desired to deionize the thyratron and the time when deionization finally occurs. As is obvious, the faster that such deionization can be brought about, the faster can be the operation of the circuitry.

Attempts have been made to control the deionization of thyratrons by the grid control thereof, but such attempts have been successful only under highly abnormal operating conditions, as, for example, with around 1% of rated current and with very high negative grid potentials. Such control, however, has been of little practical importance due to the abnormality of the operating conditions.

The present invention provides a method and means for controlling the deionization of a thyratron operating under full rated plate current and voltage by the application of normal negative potentials to the grid of the tube, without interrupting the positive plate potential on the tube.

Such grid control is brought about by the utilization of a recognized, but little appreciated, inherent characteristic of thyratrons. When a thyratron is in a conducting state, its plate voltage is not steady, but rather is oscillating at a relatively high frequency due to the capacity and inductance of the tube. Such oscillation is in the order of 100 kc., and the lowest instantaneous plate voltages are very near to the extinction voltage of the tube. However, even though the instantaneous plate voltage may drop below the extinction voltage, the tube will not deionize because the deionization time is much longer than the time length of these instantaneous plate voltage excursions below the extinction voltage. Thus, the tube will continue to conduct until the plate voltage is removed. This inherent tendency of the tube to oscillate has been utilized in the present invention by the addition of a proper amount of capacitance across the tube, which has given a twofold result. The frequency of oscillation has been reduced, and the bottom peaks of the oscillations have become less positive. As a consequence, a considerable portion of each cycle of plate voltage oscillation is below the extinction voltage, even though the supply voltage remains constant. The tube will remain in a state of conduction as long as the deionization time of the tube is longer than the periods in which the plate voltage is below the extinction voltage. The deionization time, however, is related to the grid voltage and decreases as the grid voltage becomes more negative. Grid control of deionization is then accomplished by increasing the negative grid bias until the deionization time of the tube is shorter than the length of time in each cycle of plate voltage oscillation that the plate voltage is below the extinction voltage. When this occurs, the tube will extinguish, and will not conduct again until a sufficiently positive grid voltage is applied to trigger the tube into conduction.

Accordingly, an object of the invention is to provide a method of extinguishing a conducting gaseous thermionic tube having inherent high frequency oscillations of its plate voltage which comprises reducing the frequency of said plate voltage oscillations, reducing the plate voltage so that a portion of each cycle of said plate voltage oscillations is below the extinction voltage of said tube, and decreasing the deionization time of said tube to a value less than the time said plate voltage is lower than said extinction voltage.

Another object of the invention is to provide a thyratron control circuit comprising a gas filled thermionic tube having a cathode, a control grid and a plate, said tube having an inherent high frequency oscillation of its plate voltage when in a state of conduction, a plate load connected to said plate, a continuously positive voltage source connected to said plate load, means to initiate conduction of said tube, means increasing the effective capacitance between said plate and said cathode to reduce the frequency of said plate voltage oscillations and to lower the instantaneous plate voltage for a portion of each cycle of said oscillations to a value below the extinction voltage of said tube, and means to apply to said grid a negative grid bias of a value sufficient to cause the deionization time of said tube to be less than the length of time that the plate voltage is below the extinction voltage in each cycle of plate voltage oscillation.

Other objects and advantages will become apparent in the course of the following detailed description.

In the drawings, forming a part of this application, and in which like parts are designated by like reference numerals throughout the same.

Fig. 1 is a circuit diagram of a control circuit embodying the invention in use with a thyratron having a single control grid.

Fig. 2 is a circuit diagram of a control circuit embodying the invention in use for the control of a thyratron by either of two control grids.

Fig. 4 is a graph illustrating typical values of capacitance required for a particular thyratron circuit in order to obtain the operation of this invention.

Figure 3:
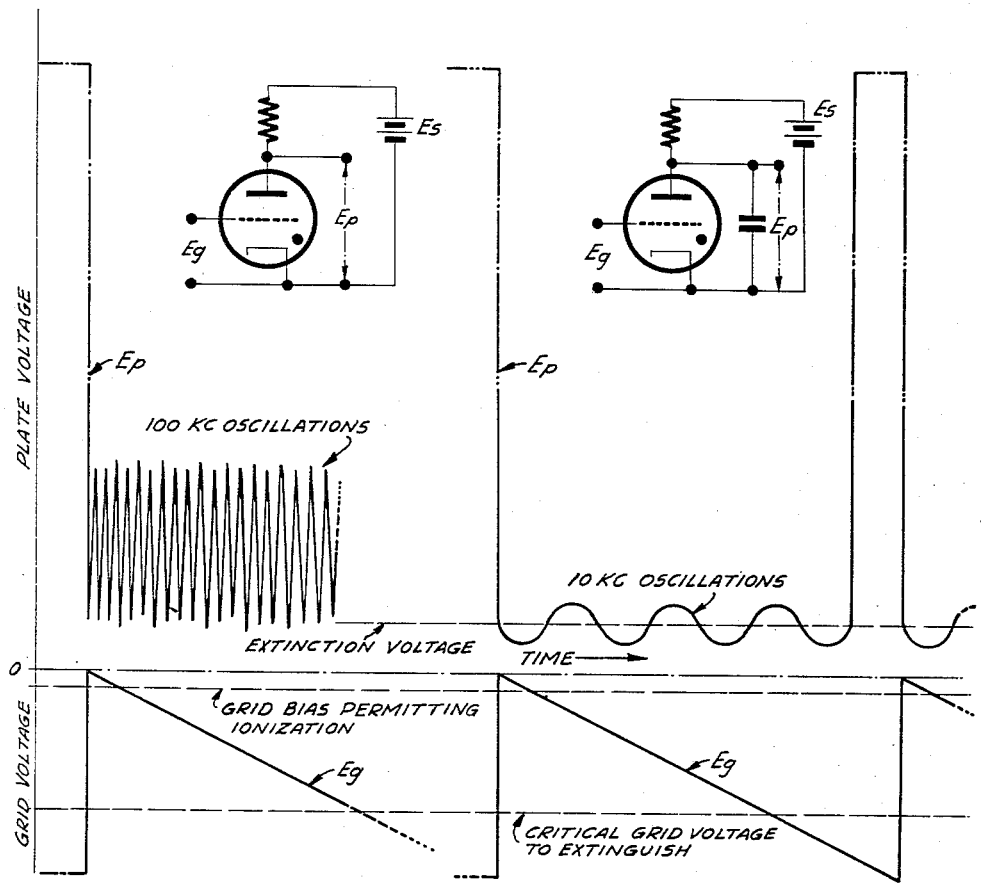
Fig. 3 is a graph illustrating the operations of a conventional thyratron circuit and of a thyratron control circuit embodying the invention.

Referring now to the drawings, and to the particular circuit embodiment of the invention shown in Fig. 1, the thyratron 10 illustrated is of the 2D21 type, such as manufactured and sold by RCA. The plate P of this tube is connected through a suitable plate load 11 to the continuously positive side of a voltage source $E_s$. The other side of the voltage source is connected to the cathode K of tube 10. The first grid $G_1$ is normally maintained at a negative potential with respect to the cathode by the grid bias voltage supply $E_{g1}$ (in series with a current limiting resistor $R_{g1}$). The closure of switch 12 enables the grid $G_1$ to be placed at the same potential as the cathode. Although a mechanical switch 12 is indicated for the purposes of illustration, any conventional electronic switching mechanism may be employed therefor.

The second grid $G_2$ is illustrated as being connected to the cathode.

Up to this point, the circuit just described is conventional, and operates in a conventional manner, as will be described. The improvement in the foregoing circuit resides in the addition of a capacitor C between the plate and cathode, to increase the effective capacitance of the tube.

Fig. 3 illustrates the difference in operation between a conventional circuit and the circuit of the present invention; i.e., without and with the capacitor C included.

In the conventional circuit, with the tube in a state of non-conduction and with a negative grid bias applied to grid $G_1$, the plate voltage $E_p$ will be equal to the supply voltage $E_s$. If the grid voltage is made sufficiently positive, the gas in the tube will ionize and the tube will start into conduction. The plate voltage will immediately drop and will oscillate at a frequency of approximately 100 kc. The lower peaks of the oscillation will be in the vicinity of the extinction voltage of the tube, but, as previously discussed, the tube will remain in conduction whether or not any portion of a cycle of plate voltage oscillation is below the extinction voltage since the time duration of such excursions will be considerably shorter than the deionization time of the tube. The grid can be made more and more negative, but it will not cause the tube to deionize. To stop the conduction of the tube, it is necessary to break the plate circuit.

The operation of the present invention is also illustrated in Fig. 3. As with the conventional circuit, when the tube is not conducting with a sufficiently negative grid bias applied thereto, the plate voltage will be equal to the supply voltage. If the grid bias is made sufficiently positive, the tube will again start into conduction and the plate voltage will drop. This time, however, the plate voltage oscillation will be at a much lower frequency, due to the additional capacity C between the plate and cathode, and the new frequency will be in the order of 10 kc. It has also been found that along with a reduced frequency of plate voltage oscillation, that the bottom peaks will be below the extinction voltage of the tube, so that for a portion of each cycle, the tube could be extinguished if the deionization time could be made sufficiently short.

As has been mentioned, the deionization time depends upon the parameters of a particular circuit, and with all other values held constant, the deionization time will decrease if the grid bias is made more negative. Thus, as indicated in Fig. 3, the grid bias is shown as being made progressively more negative. The tube will remain in conduction until the critical grid voltage is reached, at which time the deionization time of the tube is less than the length of time in each cycle of plate voltage oscillation when the instantaneous plate voltage is below the extinction voltage. The tube will be extinguished before the plate voltage can rise back above the extinction voltage, the current through the tube will cease and the plate voltage will rise again to the supply voltage.

The tube will remain in this condition until the grid is again made sufficiently positive to initiate ionization of the tube. Conduction will again occur until the grid is made sufficiently negative to deionize the tube, as above.

The particular value of capacitance which will produce the above operation is relatively critical, as illustrated in Fig. 4, wherein the workable values of capacitance for a particular tube in a particular circuit are set forth. The vertical line, $a$, at about .6 microfarad represents the maximum values of added capacitance which will produce the desired operation. If the values are higher than this figure, then relaxation oscillation of the circuit will occur, and the tube will be in intermittent conduction at the relaxation oscillation frequency. The other curve, $b$, represents the minimum value of capacity which will produce the desired operation for any given grid voltage at which conduction is to be stopped. If the capacitance is less than this amount, the plate voltage oscillations will be at too high a frequency, and the time that the plate voltage is below the extinction voltage will be less than the deionization time for that particular grid voltage. Consequently, even though the tube may start to deionize, as soon as the plate voltage rises above the extinction voltage, deionization will cease. As is apparent, any value of capacitance between the curves $a$ and $b$ will produce the desired operation.

In actual operation of a circuit, the grid bias used to produce deionization will be made considerably more negative than the critical grid voltage in order to insure against random inoperativeness, since the illustrated wave forms in Fig. 3 are somewhat idealized in presentation. Also, the negative grid bias may probably be applied suddenly, as in pulse form, rather than by a gradual application thereof. The shortness of the time lag between the application of the critical grid voltage until conduction ceases is apparent from Fig. 3, since once a sufficiently negative pulse has been applied to the grid, the tube will be deionized within approximately one cycle of plate voltage oscillation. If the grid pulse is applied at the instant that the plate voltage begins to decrease below the extinction voltage, then conduction will cease in the length of time equal to the deionization time, which will be the quickest extinction of the tube in the present circuit. The slowest extinction will occur if the grid pulse is applied when the plate voltage is already below the extinction voltage but rises thereabove before extinction can occur. Extinction will then occur on the next cycle when the plate voltage again falls below the extinction voltage. The average length of time between the application of the grid signal and the cessation of conduction for the illustrated circuit is approximately 100 microseconds; that is, the time length of one cycle of plate voltage oscillation.

Fig. 2 illustrates an important modification of the invention, wherein the deionization of tube 10 can be controlled by the application of a negative grid bias to either of the grids $G_1$ or $G_2$. Conduction of the tube will again be caused by applying a sufficiently positive grid voltage to both grids, which may be by closing switches 12 and 13 to place these grids at cathode potential. Conduction can then be interrupted by opening switch 12 which applies the grid bias of voltage source $E_{g1}$ to grid $G_1$ in the same manner as previously described. Conduction can also be stopped by leaving switch 12 closed and by opening switch 13, to apply the grid bias of voltage source $E_{g2}$ to grid $G_2$ which will also stop the conduction in the same manner as previously discussed. Thus, the invention can be used to control the deionization of tube 10 by independent signals (represented by the opening of the two independent switches 12 and 13).

The capacitor C, shown in both Figs. 1 and 2, is indicative of the effective added capacitance between the plate and cathode of tube 10, but it should be realized that there can be circuit configurations involving other arrangements of capacity, resistance and inductions than that shown specifically in these figures. The important thing is that the effective added capacitance, as a result of the particular circuit configuration, between the plate and cathode must be within the upper and lower limits generally indicated by Fig. 4, in order to produce the operative results described in this application.

The exact details of the plate load 11, in Figs. 1 and 2, form no part of this invention, and any conventional elements may be used therefor. As, for example, the plate load may be a relay coil in circuits where it is desired to perform switching operations by the conduction of the thyratron. In such instances, a capacitor may or may not be placed in parallel with the relay coil, as desired. Then again, the plate load may be purely resistive, with the voltage variations thereon being used to drive a succeeding circuit. Other combinations of inductive, capacitive and resistive elements may be employed, depending upon the results to be obtained. The only limitation on the form of the plate load is that it must not adversely affect the desired modified plate voltage oscillations described in the foregoing specification. That is, the plate load components must be such as to prevent relaxation oscillation of the circuit and to allow the effective capacitance between plate and cathode of the tube to be increased to the critical region heretofore discussed.

It is also to be realized that there are variances in the construction of tubes, capacitors, resistances, inductances and the like and that the specific values set forth in this application are intended to be illustrative in the explanation of the operation of the invention and are not intended to be absolute values. However, it will be found that the method of operation will be achieved by the selection of values for a desired circuit in accordance with the principles set forth herein.

Thus, the invention herewith shown and described is a preferred embodiment of the same, and it is to be realized that various changes may be made in the arrangement and selection of components without departing from the spirit of the invention or the scope of the attached claims.

Having thus described my invention, what I claim and desire to secure by Letters Patent is:

1. A thyratron control circuit comprising a gas filled tube having a cathode, a control grid and a plate, said tube having an inherent high frequency oscillation of its plate voltage when in a state of conduction, a plate load connected to said plate, a continuously positive voltage source connected to said plate load, means to initiate conduction of said tube, means increasing the effective capacitance between said plate and said cathode to reduce the frequency of said plate voltage oscillations and to lower the instantaneous plate voltage for a portion of each cycle of said oscillations to a value below the extinction voltage of said tube, and means to apply to said grid a negative grid bias of a value sufficient to cause the deionization time of said tube to be less than the length of time that the plate voltage is below the extinction voltage in each cycle of plate voltage oscillation.

2. A thyratron control circuit comprising a gas filled tube having a cathode, a control grid and a plate, said tube having an inherent high frequency oscillation of its plate voltage when in a state of conduction, a plate load connected to said plate, a continuously positive voltage source connected to said plate load, means to apply a voltage to said control grid to initiate conduction of said tube, means increasing the effective capacitance between said plate and said cathode to reduce the frequency of said plate voltage oscillations and to lower the instantaneous plate voltage for a portion of each cycle of said oscillations to a value below the extinction voltage of said tube, and means to apply to said grid a negative grid bias of a value sufficient to cause the deionization time of said tube to be less than the length of time that the plate voltage is below the extinction voltage in each cycle of plate voltage oscillation.

3. A thyratron control circuit comprising a thyratron tube having a cathode, a control grid and a plate, said tube having an inherent high frequency oscillation of its plate voltage when in a state of conduction, a plate load connected to said plate, a voltage source connecting said plate load and said cathode, means to apply a voltage to said control grid to initiate conduction of said tube, means to increase the effective capacitance between said plate and said cathode, said capacitance being of a value which reduces the frequency of said plate voltage oscillations and lowers the instantaneous plate voltage for a portion of each cycle of said oscillations to a value lower than the extinction voltage of said tube, and means to apply to said grid a negative grid bias of a value sufficient to cause the deionization time of said tube to be less than the length of time that the plate voltage is lower than the extinction voltage in each cycle of plate voltage oscillation.

4. A thyratron control circuit comprising a thyratron tube having a cathode, two control grids and a plate, said tube having an inherent high frequency oscillation of its plate voltage when in a state of conduction, a plate load connected to said plate, a voltage source connecting said plate load and said cathode, means to apply a voltage to one of said control grids to initiate conduction of said tube, means increasing the effective capacitance between said plate and said cathode to reduce the frequency of said plate voltage oscillations and lower the instantaneous plate voltage for a portion of each cycle of said oscillations to a value below the extinction voltage of said tube, and means to apply to either of said grids a negative grid bias of a value sufficient to cause the deionization time of said tube to be less than the length of time that the plate voltage is below the extinction voltage in each cycle of plate voltage oscillation.

References Cited in the file of this patent

UNITED STATES PATENTS

| | | |
|---|---|---|
| 1,793,329 | Langmuir | Feb. 17, 1931 |
| 2,052,273 | Blount | Aug. 25, 1936 |
| 2,855,544 | Germeshausen | Oct. 7, 1958 |